US010574939B2

(12) United States Patent
Wen et al.

(10) Patent No.: US 10,574,939 B2
(45) Date of Patent: Feb. 25, 2020

(54) INFORMATION PROCESSING APPARATUS, INFORMATION PROCESSING METHOD, AND COMMUNICATION SYSTEM

(71) Applicant: SONY CORPORATION, Tokyo (JP)

(72) Inventors: Shihhao Wen, Tokyo (JP); Mitsuru Katsumata, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/329,277

(22) PCT Filed: Oct. 6, 2017

(86) PCT No.: PCT/JP2017/036454
§ 371 (c)(1),
(2) Date: Feb. 28, 2019

(87) PCT Pub. No.: WO2018/074263
PCT Pub. Date: Apr. 26, 2018

(65) Prior Publication Data
US 2019/0253664 A1    Aug. 15, 2019

(30) Foreign Application Priority Data

Oct. 20, 2016   (JP) .................................. 2016-205944

(51) Int. Cl.
*H04N 7/14* (2006.01)
(52) U.S. Cl.
CPC .................................. *H04N 7/141* (2013.01)
(58) Field of Classification Search
CPC ...................................................... H04N 7/14
See application file for complete search history.

(56) References Cited

U.S. PATENT DOCUMENTS 7,768,543 B2 *  8/2010  Christiansen ..... H04L 29/06027
                                                        348/14.08
8,392,503 B2 *  3/2013  Kuhlke ............... H04L 12/1822
                                                        348/14.01
(Continued)

FOREIGN PATENT DOCUMENTS

EP       2278552 A1    1/2011
JP    2002-215942 A    8/2002
(Continued)

OTHER PUBLICATIONS

International Search Report and Written Opinion of PCT Application No. PCT/JP2017/036454, dated Nov. 14, 2017, 10 pages of ISRWO.

*Primary Examiner* — Olisa Anwah
(74) *Attorney, Agent, or Firm* — Chip Law Group

(57) ABSTRACT

A current status information communication unit acquires by communication, current status information of a communication partner who is a person shown in a free viewpoint time shift video being reproduced, and a current status information presentation unit presents the current status information of the communication partner to a viewer viewing the free viewpoint time shift video. Furthermore, when the viewer attempts to communicate with the communication partner, the current status information acquisition unit acquires the current status information of the viewer, and the current status information of the viewer is transmitted to the communication partner.

12 Claims, 5 Drawing Sheets

(56) References Cited

U.S. PATENT DOCUMENTS

| | | | |
|---|---|---|---|
| 8,970,663 B2* | 3/2015 | Gagneraud | H04N 5/232 |
| | | | 348/14.16 |
| 9,313,454 B2* | 4/2016 | Lalonde | H04N 7/147 |
| 2006/0098027 A1 | 5/2006 | Rice et al. | |
| 2011/0063440 A1* | 3/2011 | Neustaedter | H04N 5/144 |
| | | | 348/143 |
| 2011/0106912 A1 | 5/2011 | Onda et al. | |
| 2019/0253667 A1* | 8/2019 | Valli | G02B 27/017 |

FOREIGN PATENT DOCUMENTS

| | | |
|---|---|---|
| JP | 2003-242095 A | 8/2003 |
| JP | 2008-520011 A | 6/2008 |
| WO | 2006/052303 A1 | 5/2006 |
| WO | 2009/136605 A1 | 11/2009 |
| WO | 2015/079865 A1 | 6/2015 |

* cited by examiner

1

INFORMATION PROCESSING APPARATUS, INFORMATION PROCESSING METHOD, AND COMMUNICATION SYSTEM

CROSS REFERENCE TO RELATED APPLICATIONS

This application is a U.S. National Phase of International Patent Application No. PCT/JP2017/036454 filed on Oct. 6, 2017, which claims priority benefit of Japanese Patent Application No. JP 2016-205944 filed in the Japan Patent Office on Oct. 20, 2016. Each of the above-referenced applications is hereby incorporated herein by reference in its entirety.

TECHNICAL FIELD

The present disclosure relates to an information processing apparatus, an information processing method, a program, and a communication system, and in particular, to an information processing apparatus, an information processing method, a program, and a communication system that enable smoother communication.

BACKGROUND ART

In general, the viewpoint position and the line-of-sight direction of a video content are determined by the camera work at the time of imaging, and a viewer views the video whose viewpoint position and viewing direction are restricted. Therefore, a viewer viewing such a video content can easily notice that the video was captured at the past time point. In other words, since the viewpoint position and the line-of-sight direction of the video content are restricted, the viewer can distinguish the difference from the real space in which the viewer can freely move and look around.

On the other hand, in recent years, the virtual reality (VR) technology has evolved, and video contents whose viewpoint position and line-of-sight direction can be freely changed are created. In the VR space reproduced by such video contents, the viewer can freely move and look around, and can satisfy that the gap between the VR space and the real world is greatly decreased.

Furthermore, Patent Document 1 discloses a communication system that presents data for selecting a person to communicate and enables communication with a person determined to be appropriate on the basis of the data.

CITATION LIST

Patent Document

Patent Document 1: Japanese Patent Application Laid-Open No. 2002-215942

SUMMARY OF THE INVENTION

Problems to be Solved by the Invention

By the way, along with further progress of the VR technology, it is predicted that the viewer will be able to perceive the VR space as real space. Therefore, it is assumed that a case may be occur in which a viewer misunderstands people existing virtually in the VR space as being real people existing there, and talks to the virtual people in the VR space. However, it is obvious that a virtual person in the VR space cannot respond to the talking of the viewer, and desired is ingenuity for achieving communication via video contents whose viewpoint position and line-of-sight direction can be freely changed.

The present disclosure has been made in view of such a situation, and enables smoother communication.

Solutions to Problems

An information processing apparatus according to a first aspect of the present disclosure includes: a current status information communication unit that acquires by communication, current status information indicating current status of a communication partner who is a person shown in video being reproduced; and a current status information presentation unit that presents the current status information of the communication partner acquired by the current status information communication unit to a viewer viewing the video.

An information processing method or a program according to a first aspect of the present disclosure includes: acquiring by communication, current status information indicating current status of a communication partner who is a person shown in video being reproduced; and presenting the acquired current status information of the communication partner to a viewer viewing the video.

In the first aspect of the present disclosure, current status information indicating current status of a communication partner who is a person shown in video being reproduced is acquired by communication, and the current status information of the communication partner is presented to a viewer viewing the video.

An information processing apparatus according to a second aspect of the present disclosure includes: a current status information communication unit that acquires current status information indicating current status of a viewer transmitted in response to attempting of communication by the viewer viewing video showing a user, with the user as a communication partner; and a current status information presentation unit that presents the current status information of the viewer acquired by the current status information communication unit to the user.

An information processing method or program according to a second aspect of the present disclosure includes: acquiring current status information indicating current status of a viewer transmitted in response to attempting of communication by the viewer viewing video showing a user, with the user as a communication partner; and presenting the acquired current status information of the viewer to the user.

In the second aspect of the present disclosure, current status information is acquired, the current status information indicating current status of a viewer transmitted in response to attempting of communication by the viewer viewing video showing a user, with the user as a communication partner; and the current status information of the viewer is presented to the user.

A communication system according to a third aspect of the present disclosure includes: an information processing apparatus of a viewer side having a current status information communication unit that acquires by communication, current status information indicating current status of a communication partner who is a person shown in video being reproduced, and a current status information presentation unit that presents the current status information of the communication partner acquired by the current status information communication unit to the viewer viewing the video; and an information processing apparatus of the communication partner side having a current status information communication unit that acquires current status information indicating current status of the viewer transmitted in response to attempting of communication by the viewer viewing video showing a user, with the user as a communication partner, and a current status information presentation unit that presents the current status information of the viewer acquired by the current status information communication unit to the user.

In the third aspect of the present disclosure, current status information indicating current status of a communication partner who is a person shown in video being reproduced is acquired by communication, and the current status information of the communication partner is presented to a viewer viewing the video. On the other hand, current status information indicating current status of a viewer transmitted in response to attempting of communication by the viewer viewing video showing a user, with the user as a communication partner, is acquired, and the current status information of the viewer is presented to the user.

Effects of the Invention

According to first to third aspects of the present disclosure, smoother communication can be performed.

MODE FOR CARRYING OUT THE INVENTION

Specific embodiments to which the present technology is applied will be described in detail below with reference to the drawings.

<Configuration Example of Communication System>

Figure 1:
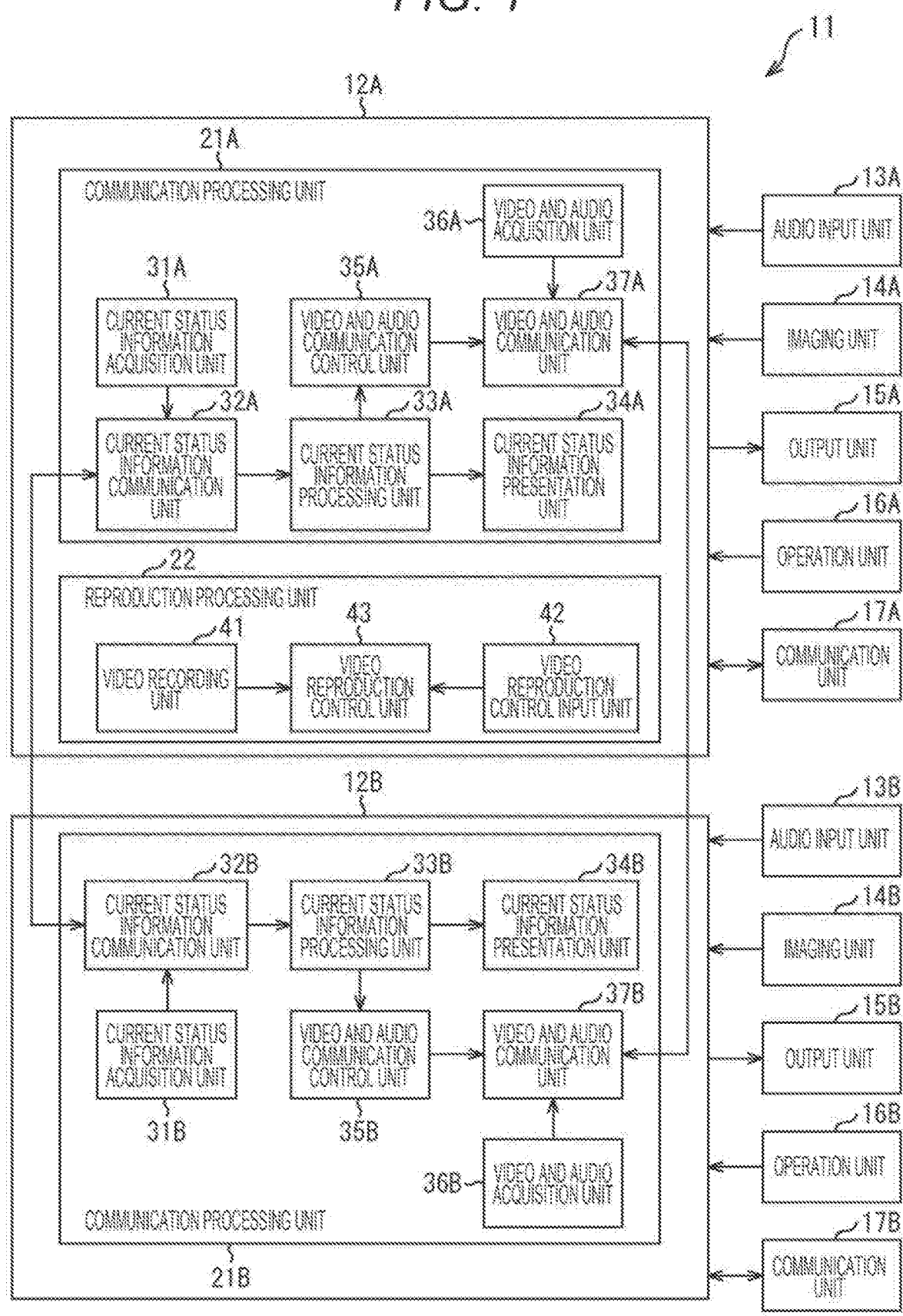
FIG. 1 is a block diagram showing a configuration example of a communication system according to an embodiment to which the present technology is applied.

FIG. 1 is a block diagram showing a configuration example of a communication system according to an embodiment to which the present technology is applied.

A communication system 11 shown in FIG. 1 is configured such that two information processing apparatuses 12A and 12B communicate with each other, and a user A of the information processing apparatus 12A and a user B of the information processing apparatus 12B communicate with each other. Note that the communication system 11 may be configured such that two or more information processing apparatuses 12 communicate with each other.

Furthermore, in the communication system 11, as will be described later, video is reproduced in the information processing apparatus 12A, and the user A of the information processing apparatus 12A who views the video is also referred to as a viewer. Furthermore, the user B of the information processing apparatus 12B, who is a person shown in the video reproduced by the information processing apparatus 12A and is a partner requested to communicate from the user A of the information processing apparatus 12A, is also referred as a communication partner.

The information processing apparatus 12A is connected to an audio input unit 13A, an imaging unit 14A, an output unit 15A, an operation unit 16A, and a communication unit 17A, and the information processing apparatus 12A includes a communication processing unit 21A and a reproduction processing unit 22.

For example, the audio input unit 13A is configured by a microphone that inputs audio and inputs audio spoken by the user A of the information processing apparatus 12A to the information processing apparatus 12A.

The imaging unit 14A includes an imaging device using, for example, a charge coupled device (CCD), a complementary metal oxide semiconductor (CMOS) image sensor, or the like, and inputs video obtained by photographing the user A of the information processing apparatus 12A to the information processing apparatus 12A.

The output unit 15A includes, for example, a display for displaying video, a speaker that outputs audio, or the like, outputs video and audio reproduced by the information processing apparatus 12A, and causes the user A of the information processing apparatus 12A to view the video and audio. Furthermore, the output unit 15A outputs the video and audio of the user B transmitted from the information processing apparatus 12B by communication of the information processing apparatus 12A and the information processing apparatus 12B.

The operation unit 16A includes various buttons, a touch panel, or the like, for example, and inputs an operation signal corresponding to operation by the user A of the information processing apparatus 12A to the information processing apparatus 12A.

The communication unit 17A is configured by a communication module for performing data communication, communication by audio and video (so-called video call) or the like, via a network such as the Internet, for example, and performs communication between the information processing apparatus 12A and the information processing apparatus 12B.

The communication processing unit 21A includes a current status information acquisition unit 31A, a current status information communication unit 32A, a current status information processing unit 33A, a current status information presentation unit 34A, a video and audio communication control unit 35A, a video and audio acquisition unit 36A, and a video and audio communication unit 37A. For example, when the user A communicates with the information processing apparatus 12B to communicate with the user B, the communication processing unit 21A functions as an assistant system that supports the communication smoothly.

When the user A of the information processing apparatus 12A is viewing the video reproduced by the reproduction processing unit 22, the current status information acquisition unit 31A acquires the current status information of the user A, and supplies the current status information to the current status information communication unit 32A. For example, the current status information acquisition unit 31A acquires information indicating the content of the video being viewed by the user A, information indicating the reproduction time of the video, or the like as the current status information of the user A. Moreover, for example, when the user A is in the VR space reproduced by the free viewpoint time shift video, the current status information acquisition unit 31A acquires information indicating the viewing status such as the reproduction time of the video, the viewpoint position or the line-of-sight direction of the user A as the current status information of the user A.

The current status information communication unit 32A acquires current status information representing the current status of a person who is regarded as a communication partner recognized as being shown in the video being viewed by the user A. For example, in a case where the user B of the information processing apparatus 12B is shown in the video, the current status information communication unit 32A communicates with the current status information communication unit 32B of the information processing apparatus 12B to acquire current status information of the user B who is a communication partner, and supplies the current status information to the current status information processing unit 33A. Furthermore, when the user A attempts to communicate with the user B, the current status information communication unit 32A transmits the current status information of the user A supplied from the current status information acquisition unit 31A to the current status information communication unit 32B of the information processing apparatus 12B.

The current status information processing unit 33A performs processing of determining whether or not the user B can respond to the communication with the user A, for example, on the basis of the current status information of the user B supplied from the current status information communication unit 32A, and supplies the determination result to the current status information presentation unit 34A. Furthermore, in a case of determining that the user B can respond to the communication with the user A, the current status information processing unit 33A notifies the video and audio communication control unit 35A of the determination result.

The current status information presentation unit 34A presents the determination result supplied from the current status information processing unit 33A, in other words, whether or not the user B can respond to the communication with the user A, to the user A. For example, the current status information presentation unit 34A can display a message on the display of the output unit 15A, or output audio from the speaker of the output unit 15A, to present the determination result based on the current status information of the user B to the user A. Note that the current status information presentation unit 34A may present the current status information of the user B itself acquired by the current status information communication unit 32A to the user A.

When the determination result that the user B can respond to the communication with the user A is supplied from the current status information processing unit 33A, the video and audio communication control unit 35A controls the video and audio communication unit 37A to communicate with the information processing apparatus 12B.

The video and audio acquisition unit 36A acquires the audio of the user A input from the audio input unit 13A and the video of the user A input from the imaging unit 14A and supplies the acquired audio and video to the video and audio communication unit 37A.

The video and audio communication unit 37A can perform video and audio communication with the video and audio communication unit 37B of the information processing apparatus 12B via the communication unit 17A. For example, the video and audio communication unit 37A transmits the audio and video of the user A supplied from the video and audio acquisition unit 36A to the video and audio communication unit 37B according to the control of the video and audio communication control unit 35A. Then, the video and audio communication unit 37A receives the audio and video of the user B transmitted from the video and audio communication unit 37B, and causes the output unit 15A to output the audio and video.

The reproduction processing unit 22 includes a video recording unit 41, a video reproduction control input unit 42, and a video reproduction control unit 43. For example, the reproduction processing unit 22 performs processing of reproducing free viewpoint time shift video having omni-directionality of 360°, in which the viewpoint position and the line-of-sight direction can be freely changed, and the reproduction time can be freely moved, and the reproduction processing unit 22 causes the user A to view the free viewpoint time shift video. In other words, the free viewpoint time shift video is omnidirectional moving image content including a moving image captured by an imaging device capable of capturing omnidirectionally, and is video whose viewpoint can be freely changed with respect to the omnidirectional moving image. Note that the video of which only the line-of-sight direction can be changed may be used.

The video recording unit 41 can record free viewpoint time shift video on a hard disk device or an optical disk. Furthermore, the video recording unit 41 can record the viewing status such as the reproduction time of the video, the viewpoint position, or the line-of-sight direction, with respect to the free viewpoint time shift video being reproduced.

When the user A operates the operation unit 16A, selects a desired free viewpoint time shift video, and instructs reproduction, the video reproduction control input unit 42 controls the video reproduction control unit 43 to reproduce the free viewpoint time shift video selected by the user A. Furthermore, in a case where a head mounted display that can be worn on the head of the user A is used as the output unit 15A, the video reproduction control input unit 42 tracks and acquires a posture such as the position and orientation of the head having correlation with the line-of-sight direction of the user A. Then, the video reproduction control input unit 42 supplies the information indicating the posture of the head of the user A to the video reproduction control unit 43 to change the line-of-sight direction of the free viewpoint time shift video according to the line of sight of the user A.

For example, in the information processing apparatus 12A, the posture of the head of the user A can be grasped by incorporating an inertial measurement unit (IMU) that measures inertia into a head mounted display used as the output unit 15A. Alternatively, in the information processing apparatus 12A, it is possible to grasp the posture of the head of the user A by image analyzing the video input from the imaging unit 14A that images the user A. Moreover, in the information processing apparatus 12A, it is possible to grasp the posture of the head of the user A by attaching markers or feature points to the head mounted display, the head of the user A, or the like, and tracking the positions thereof. Furthermore, the IMU and the imaging unit 14A may be used in combination.

The video reproduction control unit 43 performs control to read, from the video recording unit 41, the free viewpoint time shift video according to the selection by the user A and reproduce the video and causes the display of the output unit 15A to display the reproduced video. Moreover, the video reproduction control unit 43 can trim part of the video according to the information indicating the posture of the head of the user A supplied from the video reproduction control input unit 42 and supply the video to the output unit 15A, so that the video of the line-of-sight direction according to the line of sight of the user A is displayed.

Note that, as similar to the information processing apparatus 12A, the information processing apparatus 12B is connected to the audio input unit 13B, the imaging unit 14B, the output unit 15B, the operation unit 16B, and the communication unit 17B. Furthermore, the information processing apparatus 12B includes a communication processing unit 21B having the same configuration as that of the communication processing unit 21A, and the processing performed in the communication processing unit 21B will be described later.

The communication system 11 is configured as described above, and acquires the current status information of the user B shown in the video and presents the current status information to the user A, so that the user A can communicate with the user B after grasping the actual state of the user B. Furthermore, in the communication system 11, the current status information of the user A is acquired and presented to the user B, and after the user B has grasped the viewing status of the user A, the communication from the user A to the user B can be started. Accordingly, the user A and the user B can communicate more smoothly by using the communication system 11.

Here, the processing performed in the communication processing unit 21A will be further described.

As described above, the current status information acquisition unit 31A, the current status information communication unit 32A, the current status information processing unit 33A, and the current status information presentation unit 34A perform processing of presenting the current status information of the user B shown in the video reproduced by the reproduction processing unit 22 to the user A. Furthermore, the video and audio communication control unit 35A, the video and audio acquisition unit 36A, and the video and audio communication unit 37A perform processing of connecting the user A and the user B by video and audio so that the user A and the user B communicate with each other.

For example, the current status information processing unit 33A performs processing of controlling the current status information presentation unit 34A to perform presentation to the user A on the basis of whether or not the user A is ready to talk and whether or not the user B can speak.

In other words, in a case where the user A is ready to talk and the user B can speak, the current status information processing unit 33A controls the current status information presentation unit 34A to present that the user B can communicate with the user A. Furthermore, in a case where the user A is ready to talk and the user B cannot speak, the current status information processing unit 33A controls the current status information presentation unit 34A to present that the user B cannot communicate with the user A. On the other hand, in a case where the user A is not ready to talk, in order to prevent the user A from being bothered by unnecessary information, irrespective of whether or not the user B can speak, the current status information processing unit 33A controls the current status information presentation unit 34A not to perform presentation to the user A.

In this way, the current status information processing unit 33A can make various determinations on the basis of current status information of the user A and the user B supplied from the current status information communication unit 32A. Moreover, the current status information processing unit 33A can easily extend the way to present the current status information of the user B to the user A, not only whether or not the user A is ready to talk and whether or not the user B can speak. Furthermore, this also applies to the way to present the current status information of the user A to the user B.

In addition, for example, the movement of the user B may be monitored using a motion sensor as the current status information acquisition unit 31B of the information processing apparatus 12B. In this case, if the movement of the user B cannot be detected for a while, the user B is presumed to be sleeping. As a result, the current status information processing unit 33A controls the current status information presentation unit 34A to display the mark "Zzz . . . " indicating that the user B is sleeping, around the head of the user B shown in the video, for example, to present that the user B is sleeping to the user A.

In this way, the current status information processing unit 33A superimposes and displays whether or not the user B can speak, on the video in which the user B is displayed, to allow the user A to recognize whether or not the user B can speak. As an example thereof, it is described as above that the mark "Zzz . . . " indicating that the user is sleeping is indicated. As similar to this, according to many other display methods, it is possible to present the current status information of various people in the VR space shown in the video to the user A who is a viewer.

Furthermore, the video and audio communication control unit 35A can be used to determine whether or not the current status information of the user A or the user B supplied from the current status information communication unit 32A is appropriate for connecting the user A and the user B. For example, in a case where the user B can speak according to the current status information acquired from the current status information communication unit 32A, the video and audio communication control unit 35A controls the video and audio communication unit 37A to start transmission of the audio information or the video information of the user A to the information processing apparatus 12B. Then, in this case, the video and audio communication unit 37A starts reception of audio information or video information of the user B transmitted from the video and audio communication unit 37B of the information processing apparatus 12B.

Note that the audio information or the video information of the user A transmitted by the video and audio communication unit 37A to the information processing apparatus 12B is acquired by the video and audio acquisition unit 36A. For example, the video and audio acquisition unit 36A can simultaneously acquire the audio and video of the user A by the audio input unit 13A and the imaging unit 14A configured as a so-called web camera. Furthermore, the audio information or the video information of the user B received by the video and audio communication unit 37A is supplied to the output unit 15A configured as a so-called television set, for example. As a result, the user A can view the video and audio of the user B, and the user A and the user B can communicate with each other.

Such processing is performed by each block constituting the communication processing unit 21A.

Processing performed in the communication processing unit 21B will be described similarly.

The current status information acquisition unit 31B, the current status information communication unit 32B, the current status information processing unit 33B, and the current status information presentation unit 34B perform processing of presenting the current status information of the user A to the user B. Furthermore, as similar to the video and audio communication control unit 35A, the video and audio acquisition unit 36A, and the video and audio communication unit 37A, the video and audio communication control unit 35B, the video and audio acquisition unit 36B, and the video and audio communication unit 37B perform processing of connecting the user A and the user B by video and audio so that the user A and the user B communicate with each other.

The current status information acquisition unit 31B can acquire the current status information of the user B by checking whether or not communication with the user B can be performed, for example. Alternatively, the current status information acquisition unit 31B can determine whether or not the user B can perform communication by monitoring the user B, for example, and acquire the current status information of the user B.

The current status information communication unit 32B communicates with the current status information communication unit 32A of the communication processing unit 21A to receive the current status information of the user A who is a viewer and also transmit the current status information of the user B supplied from the current status information acquisition unit 31B. Examples of the current status information of the user A received by the current status information communication unit 32B include the reproduction time of the free viewpoint time shift video being viewed by the user A, and the viewpoint position and the line-of-sight direction of the user A in the VR space reproduced by the free viewpoint time shift video.

Furthermore, in the present embodiment, the current status information processing unit 33B controls the current status information presentation unit 34B to perform presentation useful for the user B to understand the viewing status of the VR space by the user A on the basis of the current status information (the reproduction time of the video, or the viewpoint position and the line-of-sight direction of the user A) of the user A being in the VR space. For example, the current status information presentation unit 34B can use the 30-second video that the user A has viewed before giving a message to the user B, as the current status information of the user A presented to the user B.

Note that there are many different kinds of current status information of user A, and using what is useful for the user B to understand what is happening to the user A as current status information of the user A is considered to be useful for the user B to quickly grasp the status of the user A. For example, as the current status information of the user A, it is possible to use the speaking content spoken by the user A when the user A is viewing the video, the emotion estimated from the facial expression of the user A viewing the video, or the like.

The current status information of the user A received by the current status information communication unit 32B and the processing performed by the current status information processing unit 33B will be described with reference to the following specific examples.

For example, a case will be described where, in the current status information of the user A, the emotion of the user A is "anger", the speaking content of the user A is "this is terrible", the video viewed by the user A is "the piano practice by the user B of last week". In this case, as a first example, the current status information processing unit 33B can perform processing of generating a message of "User A said that 'This is terrible' with anger while viewing your piano practice of last week". Alternatively, as a second example, the current status information processing unit 33B can perform processing of displaying the video of 30 seconds that the user A has viewed before giving a message, and outputting the audio "This is terrible" obtained by recording the speaking of the user A.

Accordingly, the user B can easily understand the status of the user A, for example, by viewing the message generated by the current status information processing unit 33B. Furthermore, this message is also useful for the user B to prepare for the conversation in response to the message of the user A.

By the way, the configuration of the current status information presentation unit 34B varies depending on the processing performed by the current status information processing unit 33B. For example, in a case where the current status information processing unit 33B performs processing of displaying video, the current status information presentation unit 34B is configured to be capable of displaying video on the display of the output unit 15B. Furthermore, in a case where the current status information processing unit 33B performs processing of outputting audio, the current status information presentation unit 34B is configured to be capable of outputting audio from the speaker of the output unit 15B.

Furthermore, the video and audio communication control unit 35B can be used to determine whether or not the current status information of the user A or the user B supplied from the current status information communication unit 32B is appropriate for connecting the user A and the user B. For example, the video and audio communication control unit 35B can determine whether or not the user A and the user B are connected by a simple method of asking the user B whether or not the user B can speak with the user A.

Then, in a case where the user B can speak with the user A, the video and audio communication control unit 35B controls the video and audio communication unit 37B to start transmission of the audio information or the video information of the user B to the information processing apparatus 12A. Then, in this case, the video and audio communication unit 37B starts reception of audio information or video information of the user A transmitted from the video and audio communication unit 37A of the information processing apparatus 12A.

Note that the audio information or the video information of the user B transmitted by the video and audio communication unit 37B to the information processing apparatus 12A is acquired by the video and audio acquisition unit 36B. For example, the video and audio acquisition unit 36B can simultaneously acquire the audio and video of the user B by the audio input unit 13B and the imaging unit 14B configured as a so-called web camera. Furthermore, the audio information or the video information of the user A received by the video and audio communication unit 37B is supplied to the output unit 15B configured as a so-called television set, for example. As a result, the user B can view the video and audio of the user A, and the user A and the user B can communicate with each other.

<Processing Based on Current Status Information>

Figure 2:
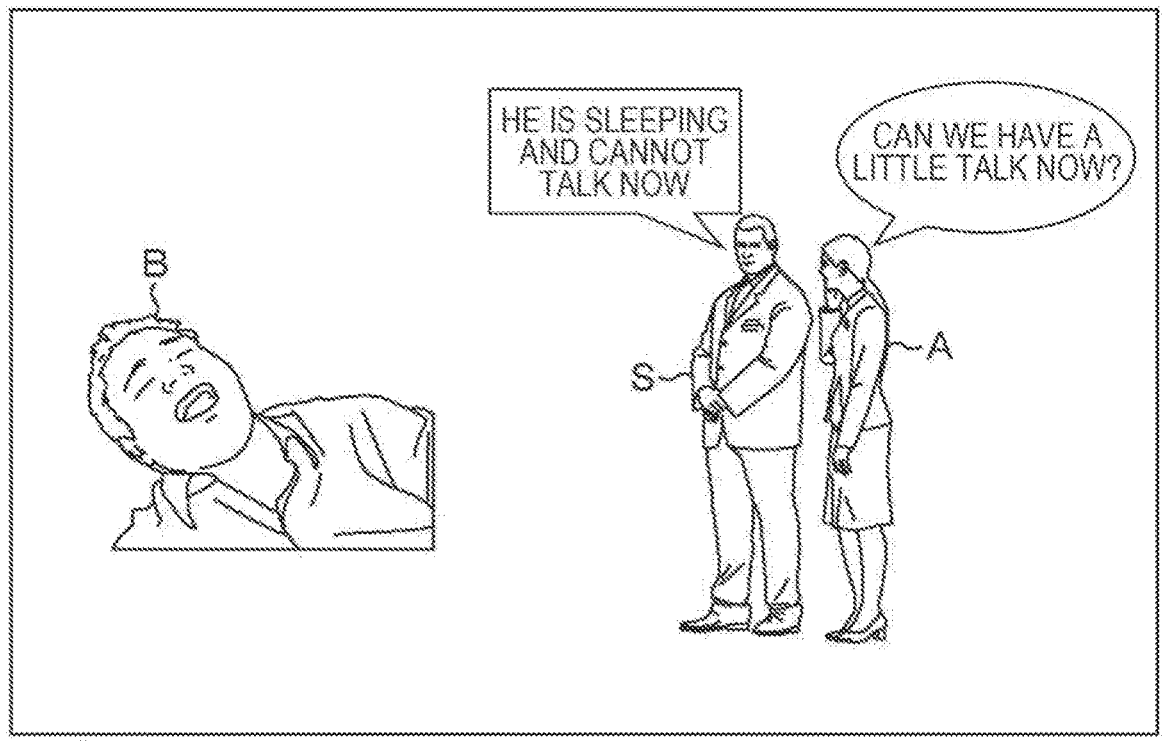
FIG. 2 is a diagram illustrating an example of processing based on current status information of a communication partner.
Figure 3:
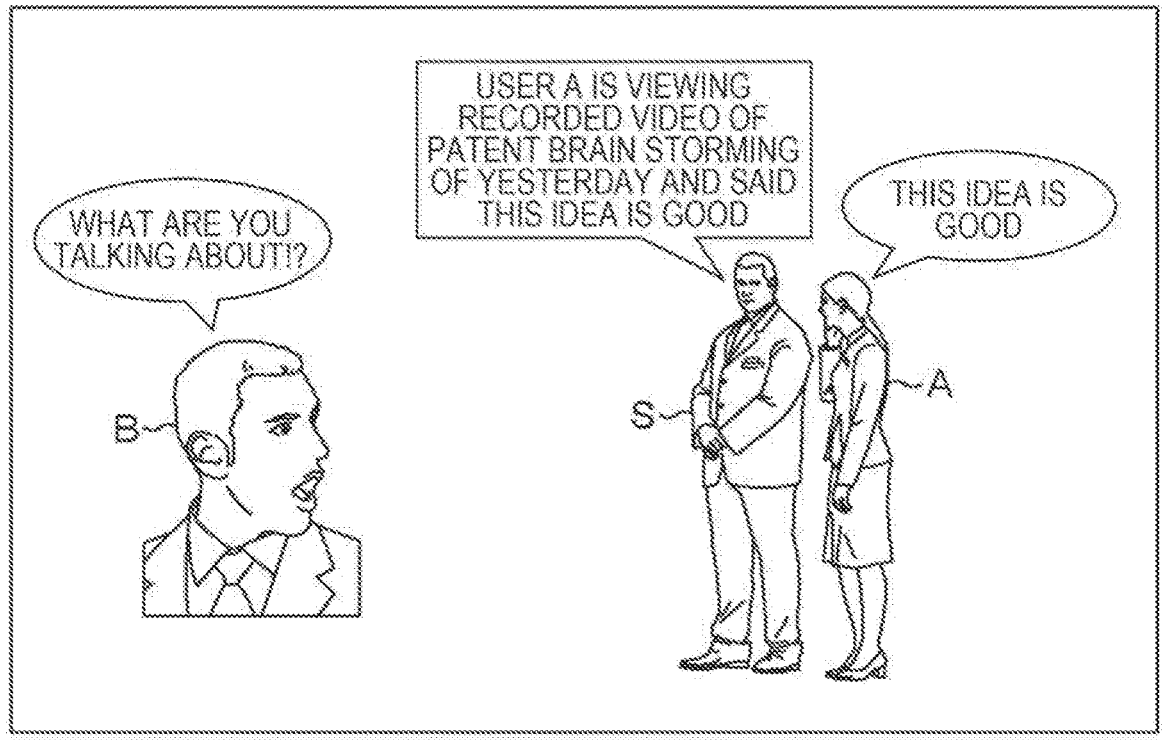
FIG. 3 is a diagram illustrating another example of processing based on current status information of a communication partner.

With reference to FIGS. 2 and 3, an example of processing performed in the communication system 11 on the basis of the current status information of each of the communication partner and the viewer will be described.

For example, FIG. 2 shows status where the user A of the information processing apparatus 12A views the video showing the user B of the information processing apparatus 12B and gives a message, "Can we have a little talk now?", to the user B in the video. At this time, the user B in the video being viewed by the user A is captured in the past and it is assumed that the current user B is sleeping and cannot respond.

Therefore, an assistant system S provided with the function by the communication processing unit 21A can present a message "He is sleeping and cannot talk now" on the basis of the current status information of the user B, with respect to the message of the user A.

In this way, by using the communication system 11, it is possible to determine whether or not the current status of the user B shown in the video is that the user B can communicate with the user A, and present the determination result to the user A. As a result, the communication system 11 can avoid a situation where the sleeping user B is woken up to hurt the user's feeling. Furthermore, since the user A can also recognize the reason why the user B cannot respond, the user A can smoothly communicate with the user B later.

Furthermore, as similar to FIG. 2, FIG. 3 shows a situation where the user A of the information processing apparatus 12A views the video showing the user B of the information processing apparatus 12B and gives a message to the user B in the video, "This idea is good". At this time, if the user B does not know anything about the video that the user A is viewing, it is assumed that the user B responds "What are you talking about!?"

Therefore, an assistant system S provided with the function by the communication processing unit 21A presents to the user B beforehand, a message "User A is viewing recorded video of patent brain storming of yesterday and said this idea is good" as the current status information of the user A, with respect to the message of the user A. As a result, the user B can grasp the content of the video being viewed by the user A beforehand, and can respond smoothly to the message of the user A.

In this way, by using the communication system 11, it is possible to present to the user B shown in the video beforehand what kind of content the user A is attempting to communicate. As a result, the communication system 11 can avoid the situation where the user B is surprised at sudden communication, so that the user A and the user B can communicate more smoothly.

<Communication Processing>

Figure 4:
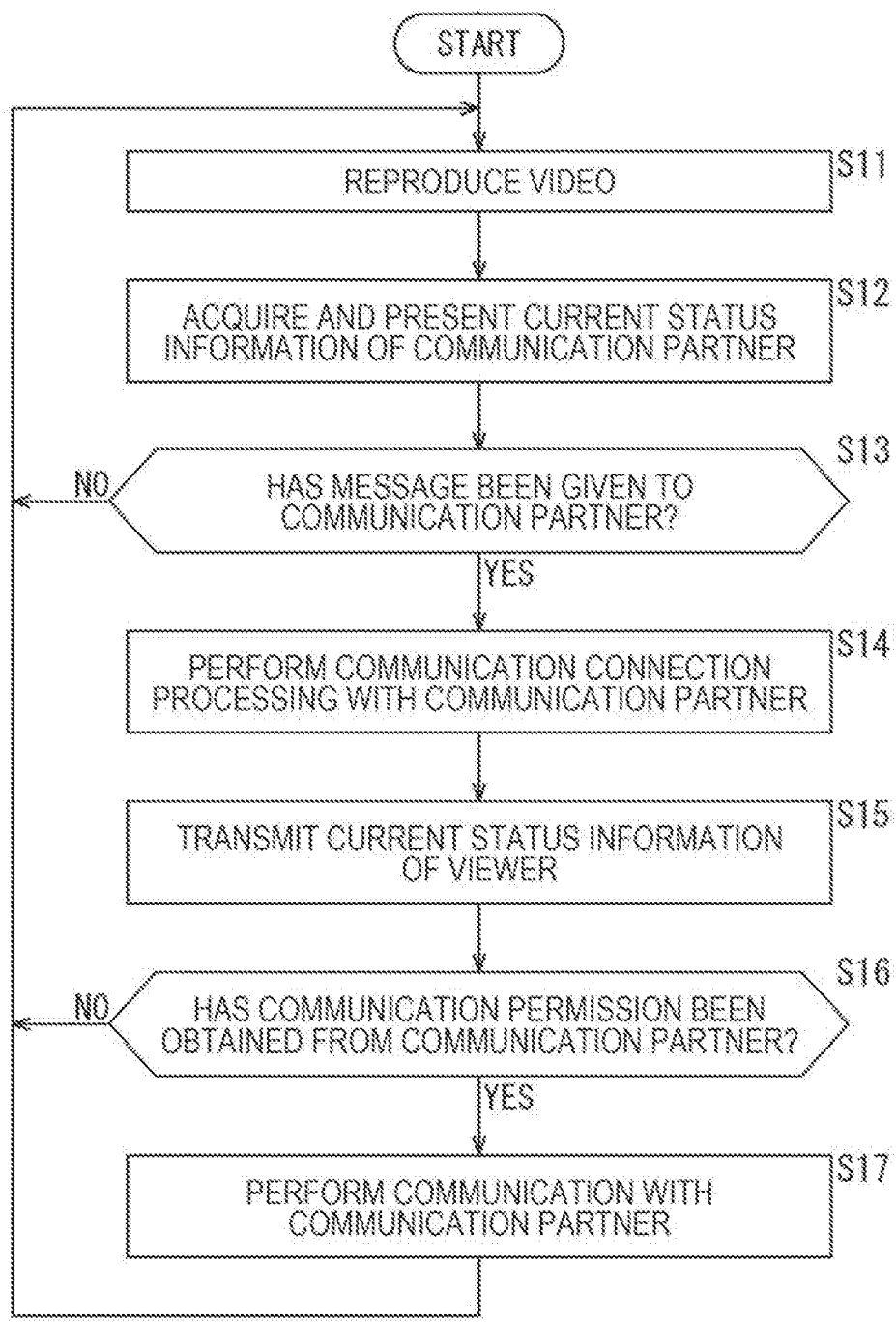
FIG. 4 is a flowchart illustrating communication processing on a viewer side.

FIG. 4 is a flowchart illustrating communication processing performed in the information processing apparatus 12A.

For example, when the user A operates the operation unit 16A to select a desired free viewpoint time shift video and instructs the reproduction thereof, the processing is started.

In step S11, the video reproduction control input unit 42 controls the video reproduction control unit 43 to reproduce the free viewpoint time shift video selected by the user A. In accordance with this, the video reproduction control unit 43 reads the free viewpoint time shift video recorded in the video recording unit 41, reproduces the free viewpoint time shift video, and outputs the result from the output unit 15A. As a result, the user A is in a state of virtually being together with the user B at the time when the video is recorded, in the VR space reproduced by the free viewpoint time shift video.

In step S12, the current status information communication unit 32A communicates with the current status information communication unit 32B of the information processing apparatus 12B with the user B shown in the video being viewed by the user A as a communication partner, to acquire the actual current status information of the user B at the moment. Then, the current status information presentation unit 34A presents the current status information of the user B acquired by the current status information communication unit 32A to the user A.

In step S13, the current status information processing unit 33A determines whether or not a message is given by the user A to the user B who is a communication partner shown in the free viewpoint time shift video being reproduced, on the basis of the audio input from the audio input unit 13B.

In step S13, in a case where the current status information processing unit 33A determines that the message has not given by the user A to the user B, the processing returns to step S11, and similar processing is repeated thereafter.

On the other hand, in step S13, in a case where the current status information processing unit 33A determines that the message has given by the user A to the user B, the processing proceeds to step S14. At this time, the user A gives a message to the user B after grasping the current status information of the user B presented in step S12.

In step S14, in order to perform communication between the user A and the user B, the video and audio communication unit 37A performs connection processing for connecting video and audio communication to the video and audio communication unit 37B of the information processing apparatus 12B.

In step S15, the current status information acquisition unit 31A acquires the current status information of the user A who is a viewer and supplies the current status information to the current status information communication unit 32A. Then, the current status information communication unit 32A transmits the current status information of the user A supplied from the current status information acquisition unit 31A to the current status information communication unit 32B of the information processing apparatus 12B.

In step S16, the current status information processing unit 33A determines whether or not communication permission has been obtained from the user B of the information processing apparatus 12B who is a communication partner. For example, in S23 of FIG. 5 as described later, along with determination that communication with the user A is performed, when information indicating that communication is permitted is transmitted from the information processing apparatus 12B, the current status information processing unit 33A determines that communication permission has been obtained.

In step S16, in a case where the current status information processing unit 33A determines that communication permission has been obtained from the user B of the information processing apparatus 12B who is a communication partner, the process proceeds to step S17.

In step S17, the current status information processing unit 33A notifies the video and audio communication control unit 35A that the communication permission has been obtained, and the video and audio communication control unit 35A controls the video and audio communication unit 37A to communicate with the information processing apparatus 12B. In accordance with this, the video and audio communication unit 37A performs video and audio communication with the video and audio communication unit 37B, and the user A who is a viewer can communicate with the user B shown in the video being viewed as a communication partner.

After the processing of step S17 or in a case where it is determined that communication permission from the user B of the information processing apparatus 12B who is a communication partner has not been obtained in step S16, the process returns to step S11, and similar processing is repeated thereafter.

Figure 5:
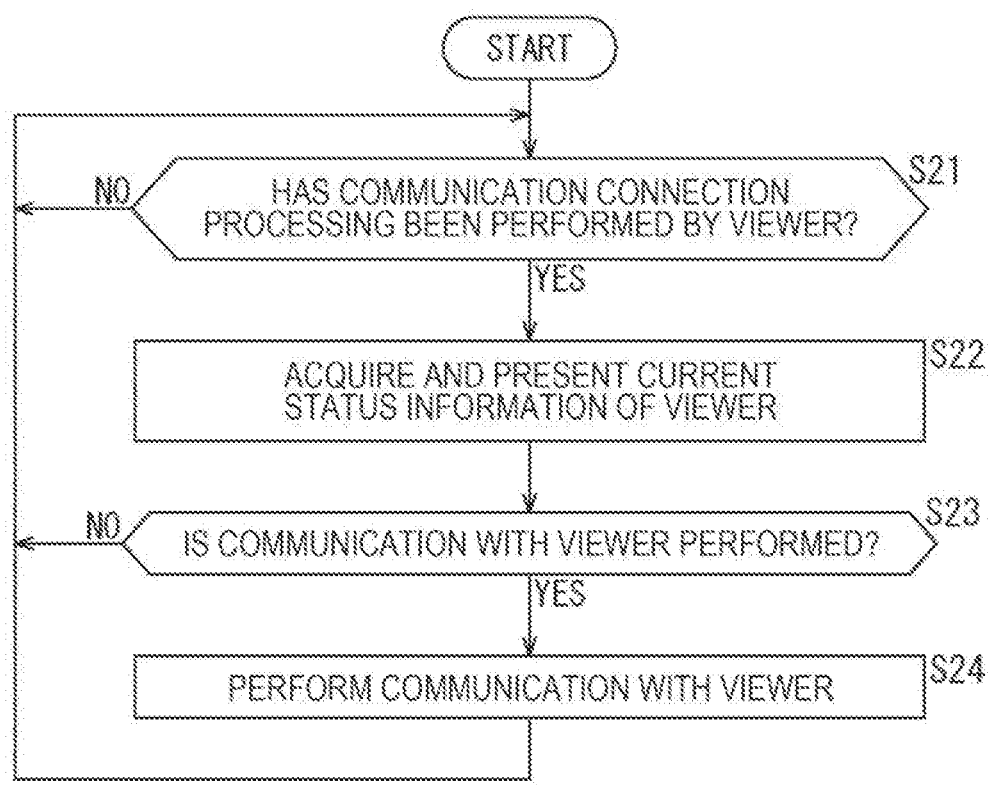
FIG. 5 is a flowchart illustrating communication processing on a communication partner side.

FIG. 5 is a flowchart illustrating communication processing performed in the information processing apparatus 12B.

In step S21, the video and audio communication unit 37B determines whether or not communication connection processing has been performed from the user A who is a viewer, and waits for processing until it is determined that the communication connection processing has been performed. For example, if the video and audio communication unit 37A performs the connection processing for connecting the video and audio communication in step S14 of FIG. 4 described above according to the message by the user A who is a viewer, the video and audio communication unit 37B determines that the communication connection processing has been performed, and the process proceeds to step S22.

In step S22, the current status information communication unit 32A acquires the current status information of the user A transmitted from the current status information communication unit 32A in step S15 of FIG. 4 described above. Then, the current status information presentation unit 34B presents the current status information of the user A acquired by the current status information communication unit 32B to the user B.

In step S23, the current status information processing unit 33B determines whether or not communication is performed with the user A who is a viewer. For example, when the user B performs operation of permitting communication for the operation unit 16B, the current status information processing unit 33B determines that communication with the viewer is performed. On the other hand, for example, when the operation by the user B is not performed, such as a case where the user B is sleeping, the current status information processing unit 33B determines that communication with the viewer is not performed.

In step S23, in a case where the current status information processing unit 33B determines that communication is performed with the user A who is a viewer, information indicating that communication is permitted is transmitted to the information processing apparatus 12A, and the process proceeds to step S24.

In step S24, the video and audio communication control unit 35B controls the video and audio communication unit 37B to communicate with the information processing apparatus 12A. In accordance with this, the video and audio communication unit 37B performs video and audio communication with the video and audio communication unit 37A, and the user B shown in the video can communicate with the user A who is a viewer of the video.

After the processing of step S24 or in a case where it is determined that communication is not performed with the user A who is a viewer in step S23, the process returns to step S21, and similar processing is repeated thereafter.

As described above, the information processing apparatus 12A and the information processing apparatus 12B perform communication processing, so that the user A and the user B can perform video and audio communication after checking the current status information. As a result, the user A and the user B can communicate more smoothly.

Note that each processing that has been described with reference to the flowcharts described above need not always be performed in chronological order in accordance with the order described in the flowchart, but may be performed in parallel or individually (for example, parallel processing or processing by an object). Furthermore, the program may be processed by one CPU or processed by distributed processing by a plurality of CPUs.

Furthermore, the series of processing described above (information processing method) can be also executed by hardware or can be executed by software. In a case of executing the series of processing by software, a program included in the software is installed, from a program recording medium in which the program is recorded, to a computer incorporated in dedicated hardware, or a general personal computer or the like, for example, that can execute various functions by installing various programs.

Figure 6:
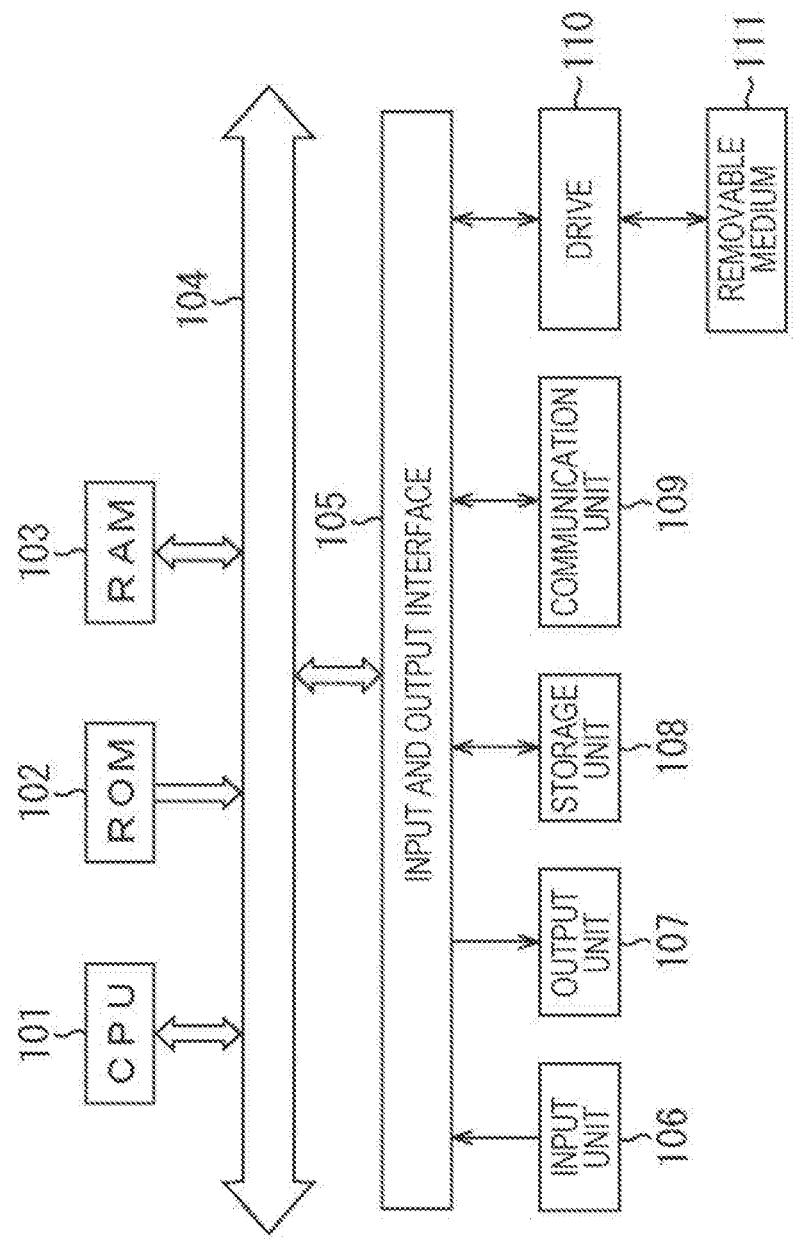
FIG. 6 is a block diagram showing a configuration example of a computer according to an embodiment to which the present technology is applied.

FIG. 6 is a block diagram showing an example of a hardware configuration of a computer that executes the above-described series of processing by a program.

In a computer, a central processing unit (CPU) 101, a read only memory (ROM) 102, and a random access memory (RAM) 103 are mutually connected by a bus 104.

An input and output interface 105 is further connected to the bus 104. To the input and output interface 105, an input unit 106 including a keyboard, a mouse, a microphone, or the like, an output unit 107 including a display, a speaker, or the like, a storage unit 108 including a hard disk, a non-volatile memory, or the like, a communication unit 109 including a network interface or the like, and a drive 110 that drives a removable medium 111 such as a magnetic disk, an optical disk, a magneto-optical disk, or a semiconductor memory are connected.

In the computer configured as described above, for example, the CPU 101 loads the program stored in the storage unit 108 into the RAM 103 via the input and output interface 105 and the bus 104, and executes the program, so that the above-described series of processing is performed.

The program to be executed by the computer (CPU 101) can be provided by being recorded in a removable medium 111 that is a package medium including, for example, a magnetic disk (including a flexible disk), an optical disk (a compact disc-read only memory (CD-ROM), a digital versatile disc (DVD), or the like), a magneto-optical disc, a semiconductor memory, or the like, or is provided via a wired or wireless transmission medium such as a local area network, the Internet, digital satellite broadcast.

Then, a program can be installed in the storage unit 108 via the input and output interface 105 by mounting the removable medium 111 to the drive 110. Furthermore, the program can be received by the communication unit 109 via a wired or wireless transmission medium and installed in the storage unit 108. In addition, the program can be installed in the ROM 102 or the storage unit 108 in advance.

Note that, the present technology can adopt the following configuration.

(1)

An information processing apparatus including:

a current status information communication unit that acquires by communication, current status information indicating current status of a communication partner who is a person shown in video being reproduced; and a current status information presentation unit that presents the current status information of the communication partner acquired by the current status information communication unit to a viewer viewing the video.

(2)

The information processing apparatus described in (1) above, in which the video is a free viewpoint time shift video.

(3)

The information processing apparatus described in (1) or (2) above, further including a current status information processing unit that performs processing of determining whether or not the communication partner can respond to communication with the viewer on the basis of the current status information of the communication partner acquired by the current status information communication unit and causes a determination result to be presented to the viewer as the current status information of the communication partner.

(4)

The information processing apparatus described in any of (1) to (3) above, further including a current status information acquisition unit that acquires current status information indicating the current status of the viewer when the viewer attempts to communicate with the communication partner, in which the current status information communication unit transmits the current status information of the viewer acquired by the current status information acquisition unit to the information processing apparatus of the communication partner side.

(5)

The information processing apparatus described in (4) above, in which the video is a free viewpoint time shift video in which a viewpoint position and a line-of-sight direction can be freely changed by the viewer and a reproduction time can be freely moved by the viewer, and as the current status information of the viewer, information indicating viewing status of the free viewpoint time shift video is used.

(6)

The information processing apparatus described in any of (1) to (5) above, further including a video and audio communication unit that performs video and audio communication with the communication partner.

(7)

An information processing method including:

acquiring by communication, current status information indicating current status of a communication partner who is a person shown in video being reproduced; and presenting the acquired current status information of the communication partner to a viewer viewing the video.

(8)

A program that causes a computer to perform information processing, the information processing including:

acquiring by communication, current status information indicating current status of a communication partner who is a person shown in video being reproduced; and presenting the acquired current status information of the communication partner to a viewer viewing the video.

(9)

An information processing apparatus including:

a current status information communication unit that acquires current status information indicating current status of a viewer transmitted in response to attempting of communication by the viewer viewing video showing a user, with the user as a communication partner; and a current status information presentation unit that presents the current status information of the viewer acquired by the current status information communication unit to the user.

(10)

The information processing apparatus described in (9) above, further including a current status information acquisition unit that acquires current status information indicating the current status of the user, in which the current status information communication unit transmits the current status information of the user acquired by the current status information acquisition unit to the information processing apparatus of the viewer side.

(11)

The information processing apparatus described in (9) or (10) above, further including a video and audio communication unit that performs video and audio communication with the viewer according to a determination result of whether or not the user can speak with the viewer.

(12) An information processing method including:

acquiring current status information indicating current status of a viewer transmitted in response to attempting of communication by the viewer viewing video showing a user, with the user as a communication partner; and presenting the acquired current status information of the viewer to the user.

(13) A program that causes a computer to perform information processing, the information processing including:

acquiring current status information indicating current status of a viewer transmitted in response to attempting of communication by the viewer viewing video showing a user, with the user as a communication partner; and presenting the acquired current status information of the viewer to the user.

(14)

A communication system including:

an information processing apparatus of a viewer side having a current status information communication unit that acquires by communication, current status information indicating current status of a communication partner who is a person shown in video being reproduced, and a current status information presentation unit that presents the current status information of the communication partner acquired by the current status information communication unit to the viewer viewing the video; and an information processing apparatus of the communication partner side having a current status information communication unit that acquires current status information indicating current status of the viewer transmitted in response to attempting of communication by the viewer viewing video showing a user, with the user as a communication partner, and a current status information presentation unit that presents the current status information of the viewer acquired by the current status information communication unit to the user.

Note that the present embodiment is not limited to the above-described embodiments, and various modifications are possible without departing from the gist of the present disclosure.

REFERENCE SIGNS LIST

11 Communication system
12 Information processing apparatus
13 Audio input unit
14 Imaging unit
15 Output unit
16 Operation unit
17 Communication unit
21 Communication processing unit
22 Reproduction processing unit
31 Current status information acquisition unit
32 Current status information communication unit
33 Current status information processing unit
34 Current status information presentation unit
35 Video and audio communication control unit
36 Video and audio acquisition unit
37 Video and audio communication unit
41 Video recording unit 42 Video reproduction control input unit
43 Video reproduction control unit

The invention claimed is:
1. An information processing apparatus, comprising:
a current status information communication unit configured to acquire current status information indicating a current status of a communication partner, wherein the communication partner is a person in a video that is reproduced;
a current status information presentation unit configured to present the current status information of the communication partner to a viewer of the video; and
a current status information acquisition unit configured to acquire current viewer status information indicating a current viewer status of the viewer when the viewer attempts to communicate with the communication partner, wherein
the video is a free viewpoint time shift video in which a viewpoint position, a line-of-sight direction, and a reproduction time are changed based on at least one viewer input, and
the current viewer status information further indicates a viewing status of the free viewpoint time shift video.

2. The information processing apparatus according to claim 1, further comprising a current status information processing unit configured to:
determine, based on the current status information of the communication partner, whether the communication partner responds to communication with the viewer,
wherein a result of the determination is presented to the viewer as the current status information of the communication partner.

3. The information processing apparatus according to claim 1,
wherein the current status information communication unit is further configured to transmit the current viewer status information of the viewer to an information processing apparatus of the communication partner.

4. The information processing apparatus according to claim 1, further comprising a video and audio communication unit configured to perform video and audio communication with an information processing apparatus of the communication partner.

5. An information processing method, comprising:
acquiring current status information indicating a current status of a communication partner, wherein the communication partner is a person in a video that is reproduced;
presenting the acquired current status information of the communication partner to a viewer of the video; and
acquiring current viewer status information indicating a current viewer status of the viewer when the viewer attempts to communicate with the communication partner, wherein
the video is a free viewpoint time shift video in which a viewpoint position, a line-of-sight direction, and a reproduction time are changed based on at least one viewer input, and
the current viewer status information further indicates a viewing status of the free viewpoint time shift video.

6. A non-transitory computer-readable medium having stored thereon computer-executable instructions, which when executed by a computer, cause the computer to execute operations, the operations comprising:
acquiring current status information indicating a current status of a communication partner, wherein the communication partner is a person in a video that is reproduced; and
presenting the acquired current status information of the communication partner to a viewer of the video; and
acquiring current viewer status information indicating a current viewer status of the viewer when the viewer attempts to communicate with the communication partner, wherein
the video is a free viewpoint time shift video in which a viewpoint position, a line-of-sight direction, and a reproduction time are changed based on at least one viewer input, and
the current viewer status information further indicates a viewing status of the free viewpoint time shift video.

7. An information processing apparatus, comprising:
a current status information communication unit configured to acquire current status information indicating a current status of a viewer, wherein
the current status information is transmitted in response to an attempt for communication by the viewer of a video, and
the video comprises a user as a communication partner; and
a current status information presentation unit configured to present the current status information of the viewer, wherein
the video is a free viewpoint time shift video in which a viewpoint position, a line-of-sight direction, and a reproduction time are changed based on at least one viewer input, and
the current status information further indicates a viewing status of the free viewpoint time shift video.

8. The information processing apparatus according to claim 7, further comprising a current user status information acquisition unit configured to acquire current user status information indicating a current status of the user,
wherein the current status information communication unit is further configured to transmit the current user status information of the user to an information processing apparatus of the viewer.

9. The information processing apparatus according to claim 7, further comprising a video and audio communication unit configured to execute video and audio communication with an information processing apparatus of the viewer, based on whether the user speaks with the viewer.

10. An information processing method, comprising:
acquiring current status information indicating a current status of a viewer, wherein
the current status information is transmitted in response to an attempt for communication by the viewer of a video, and
the video comprises a user as a communication partner; and
presenting the acquired current status information of the viewer, wherein
the video is a free viewpoint time shift video in which a viewpoint position, a line-of-sight direction, and a reproduction time are changed based on at least one viewer input, and
the current status information further indicates a viewing status of the free viewpoint time shift video.

11. A non-transitory computer-readable medium having stored thereon computer-executable instructions, which when executed by a computer, cause the computer to execute operations, the operations comprising:
acquiring current status information indicating a current status of a viewer, wherein
the current status information is transmitted in response to attempting of communication by the viewer of a video, and
the video comprises a user as a communication partner; and
presenting the acquired current status information of the viewer, wherein
the video is a free viewpoint time shift video in which a viewpoint position, a line-of-sight direction, and a reproduction time are changed based on at least one viewer input, and
the current status information further indicates a viewing status of the free viewpoint time shift video.

12. A communication system, comprising:
a first information processing apparatus of a viewer side comprising:
a first current status information communication unit configured to acquire current status information indicating a current status of a communication partner, wherein the communication partner is a person in a video that is reproduced; and
a first current status information presentation unit configured to present the current status information of the communication partner to a viewer of the video; and
a second information processing apparatus of the communication partner side comprising:
a second current status information communication unit configured to acquire current status information indicating a current status of the viewer, wherein
the current status information of the viewer is transmitted in response to an attempt for communication by the viewer of the video, and
the video comprises a user as the communication partner; and
a second current status information presentation unit configured to present the current status information of the viewer, wherein
the video is a free viewpoint time shift video in which a viewpoint position, a line-of-sight direction, and a reproduction time are changed based on at least one viewer input, and
the current status information of the viewer further indicates a viewing status of the free viewpoint time shift video.

* * * * *